United States Patent
Dosluoglu

(10) Patent No.: US 10,838,796 B2
(45) Date of Patent: Nov. 17, 2020

(54) REALTIME CRITICAL TIMING PATH POTENTIAL FAULT EVENT DETECTION AND PREVENTION FOR EMBEDDED CORES

(71) Applicant: Chaoyang Semiconductor Jiangyin Technology Co., Ltd, Jiangyin OT (CN)

(72) Inventor: Taner Dosluoglu, New York, NY (US)

(73) Assignee: Chaoyang Semiconductor Jiangyin Technology Co., Ltd., Jiangyin (CN)

( * ) Notice: Subject to any disclaimer, the term of this patent is extended or adjusted under 35 U.S.C. 154(b) by 0 days.

(21) Appl. No.: 15/894,425

(22) Filed: Feb. 12, 2018

(65) Prior Publication Data

US 2018/0232268 A1    Aug. 16, 2018

Related U.S. Application Data

(60) Provisional application No. 62/458,402, filed on Feb. 13, 2017.

(51) Int. Cl.
| | |
|---|---|
| *G06F 11/00* | (2006.01) |
| *G06F 11/07* | (2006.01) |
| *G06F 1/30* | (2006.01) |
| *G06F 1/28* | (2006.01) |

(52) U.S. Cl.
CPC .............. *G06F 11/076* (2013.01); *G06F 1/28* (2013.01); *G06F 1/305* (2013.01); *G06F 11/0721* (2013.01); *G06F 11/0772* (2013.01)

(58) Field of Classification Search
CPC ............... G06F 11/076; G06F 11/0721; G06F 11/0772; G06F 11/3024; G06F 11/3013; G06F 11/0736; G06F 11/3058; G06F 1/28; G06F 1/305
See application file for complete search history.

(56) References Cited

U.S. PATENT DOCUMENTS

| | | |
|---|---|---|
| 4,607,174 A | 8/1986 | Shoji et al. |
| 6,989,692 B1 | 1/2006 | Wong |
| 7,003,421 B1 | 2/2006 | Allen, III et al. |
| 7,348,836 B1 | 3/2008 | Velmurugan |
| 7,558,129 B2 | 7/2009 | Thorp et al. |
| 2008/0136376 A1 | 6/2008 | Nebrigic et al. |

(Continued)

FOREIGN PATENT DOCUMENTS

EP    2662791 A1    11/2013

OTHER PUBLICATIONS

International Search Report on related PCT Application No. PCT/US2018/017856 from International Searching Authority (KIPO) dated May 21, 2018.

(Continued)

*Primary Examiner* — Joseph D Manoskey
(74) *Attorney, Agent, or Firm* — Klein, O'Neill & Singh, LLP

(57) ABSTRACT

A fault detection circuit may be used to determine if voltage supplied by a voltage regulator as power to sequential logic circuitry falls below a minimum voltage expected to be required by the sequential logic circuitry for proper operation. Information regarding voltage levels supplied to the sequential logic circuitry prior to such an occurrence may be written to a memory, for example to allow for further analysis.

13 Claims, 6 Drawing Sheets

(56) References Cited

U.S. PATENT DOCUMENTS

| | | | |
|---|---|---|---|
| 2010/0020912 A1 | 1/2010 | Lesso | |
| 2010/0169031 A1 | 7/2010 | Dishman et al. | |
| 2010/0208789 A1* | 8/2010 | Cooke | H02M 3/157 375/238 |
| 2013/0069707 A1 | 3/2013 | Chaudhry et al. | |
| 2013/0093505 A1* | 4/2013 | Gupta | G05F 1/575 327/540 |
| 2013/0311799 A1* | 11/2013 | Fitzpatrick | G06F 1/3296 713/320 |
| 2013/0318364 A1 | 11/2013 | Berry, Jr. et al. | |
| 2014/0024145 A1 | 1/2014 | Bickford et al. | |
| 2014/0281696 A1* | 9/2014 | Bacha | G06F 1/26 714/10 |
| 2015/0286236 A1 | 10/2015 | Dornseifer et al. | |
| 2016/0066280 A1* | 3/2016 | Heo | H04W 52/0287 455/574 |
| 2016/0124481 A1* | 5/2016 | Avadhanam | G06F 1/28 713/340 |
| 2017/0075404 A1* | 3/2017 | Kitaji | G06F 1/305 |
| 2017/0187857 A1 | 6/2017 | Young et al. | |
| 2017/0269155 A1* | 9/2017 | Honkote | G01R 31/3173 |

OTHER PUBLICATIONS

Written Opinion on related PCT Application No. PCT/US2018/017856 from International Searching Authority (KIPO) dated May 21, 2018.

Extended European Search Report on related European Patent Application No. 18751955.8 from the European Patent Office (EPO) dated Dec. 13, 2019.

International Search Report on related PCT Application No. PCT/US2018/017882 from International Searching Authority (KIPO) dated Jun. 1, 2018.

Written Opinion on related PCT Application No. PCT/US2018/017882 from International Searching Authority (KIPO) dated Jun. 1, 2018.

Extended European Search Report (EESR) on related European Patent Application No. 18750621.7 from the European Patent Office (EPO) dated Jan. 7, 2020.

U.S. Appl. No. 15/894,820, filed Feb. 12, 2018, Anatoly Gelman, US 2018-0232028 A1, Office Action dated Oct. 4, 2019, Response to Office Action dated Jan. 6, 2020, Notice of Allowance dated Feb, 26, 2020, Apr. 29, 2020.

* cited by examiner

REALTIME CRITICAL TIMING PATH POTENTIAL FAULT EVENT DETECTION AND PREVENTION FOR EMBEDDED CORES

CROSS REFERENCE TO RELATED APPLICATION

This application claims the benefit of the filing date of U.S. Provisional Patent Application No. 62/458,402, filed on Feb. 13, 2017, the disclosure of which is incorporated by reference herein.

BACKGROUND OF THE INVENTION

The present invention relates generally to voltage regulation for integrated circuits, and more particularly to power supply related fault detection and prevention for integrated circuits with embedded processor cores.

Integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times.

Further complicating matters, some devices may be powered by batteries having relatively small capacities, while the devices themselves, at least at various times, may require large amounts of power. In such devices it may be beneficial to provide power only when needed, for example in order to lengthen effective battery life between charging. Unfortunately, the devices may quickly transition between a state requiring very little power to a state requiring large amounts of power. In such circumstances, a sudden change in magnitude of a signal on a line or wire through which power is provided may result in transient effects that cause the provision of power outside the parameters required for, or desired for, proper operation of an integrated circuit or device.

Moreover, some integrated circuits may require certain minimum voltages for reliable operation, for example to meet hold time requirements for sequential logic. Failure to meet hold time requirements for sequential logic may have unintended effects. The possible unintended effects may include possible incorrect logic operations, depending on which circuitry is in operation, what operations are being performed, and possibly other factors. Incorrect logic operations may particularly affect processor cores, for example central processing units (CPUs) and graphics processing units (GPUs), which may be embedded in integrated circuits.

BRIEF SUMMARY OF THE INVENTION

Various embodiments in accordance with aspects of the invention provide critical timing path potential voltage supply fault event detection. Some embodiments provide for 100% coverage for detection of such fault events. In some embodiments supply voltage to an embedded core is effectively compared against an alarm voltage threshold, below which proper operation of sequential logic of an embedded core may not be guaranteed, for example according to integrated circuit design parameters. If the supply voltage is below the alarm threshold, an alarm signal may be triggered, and stored or provided to, for example, a host processor. In some embodiments the comparator may operate at a clock speed of the embedded core. In some embodiments the comparator may operate at twice the clock speed of the embedded core. In some embodiments the comparator may operate at greater than twice the clock speed of the embedded core.

In some embodiments the comparator is part of another circuit. In some embodiments an embedded transient control circuit comprises voltage monitors that indicate when voltage supplied to an embedded core of an integrated circuit is below specified thresholds, including an alarm level threshold that can indicate when timing closure is no longer guaranteed due to voltage level dropping below a preset level used during synthesis of the critical path in a given digital implementation. In some embodiments on indication of voltage falling below the alarm level activates an alarm mechanism, which indicates when power integrity is in question. In various embodiments the drop in voltage below the alarm level activates the alarm mechanism even when there is no timing violation for operation of the embedded core.

In some embodiments the voltage monitors at each threshold level comprise multiple comparators running at specified clock edges with respect to each other. If a clock is available at core processor speed or higher; two comparators running at rising edge and falling edge of the clock are used for clocking the comparators in some embodiments. If the available clock is slower than the core processor speed, in some embodiments a DLL is used to generate multiple clocks that are separated by less than half the core processor clock period.

Embedded cores are generally synthesized with timing constraints at a specified guaranteed minimum voltage. If the voltage within a power domain is below this minimum specified voltage for any reason, the correct functionality of the embedded core cannot be guaranteed. The timing constraints may be considered with respect to one clock cycle of the embedded core. In some embodiments comparison of supply voltage to the embedded core is performed at least once every clock cycle of the embedded core.

In some embodiments a fault detection circuit detects whether a specific voltage threshold is crossed at every half clock cycle intervals. Detection at an every half clock cycle interval, for example, may provide 100% coverage for detection of a potential power supply voltage related potential fault event. Note that a fault event might not occur even when the minimum voltage is applied, for example if the critical timing paths are not active during that specific clock cycle.

In some embodiments the comparators are part of a transient control circuit.

Clock manipulation, including clock freeze, when a voltage droop is detected to address a fault event may result in an abrupt change causing bigger voltage variations in the power mesh. Fault detection circuit described above provides 100% coverage including half clock synchronized paths; as well as all necessary signals for an embedded transient control circuit. As a whole, together with transient control functionality, faults may be prevented or reduced, and may provide early warning and alarm when the voltage is approaching or below the safe operating region. In various embodiments fault detection and transient control works in parallel and independently from an embedded core governor and dynamic voltage and frequency control functions.

Some aspects of embodiments provide a method for performing processor power supply related timing fault detection, comprising: storing an indication of a design minimum voltage, the design minimum voltage being a minimum power supply voltage specified for a critical timing path of an embedded processor during design of the embedded processor; generating an alarm reference voltage using the indication of the design minimum voltage; comparing the alarm reference voltage to a voltage indicative of a voltage supplied to the embedded core at a clock rate at least twice as fast as a rate of a clock signal used to operate the embedded core; and setting an alarm signal in response to the alarm reference voltage being greater than the voltage indicative of the voltage supplied to the embedded core.

Some aspects of some embodiments provide circuitry for performing processor power supply related timing fault detection, comprising: a reference voltage generator configured to generate an alarm reference voltage indicative of a design minimum voltage, the design minimum voltage being a minimum power supply voltage specified for a critical timing path of an embedded processor during design of the embedded processor; and at least one voltage monitor configured to determine whether power supply voltage supplied to the embedded processor is less than the alarm reference voltage at a clock rate at least twice as fast as a rate of a clock signal used to operate the embedded core.

These and other aspects of the invention are more fully comprehended upon review of this disclosure.

DETAILED DESCRIPTION

In some embodiments a fault detection circuit includes fast comparators that monitor voltage of a voltage domain, and trigger an alarm signal when the voltage is below one, and possibly more, set voltage monitor threshold(s). The voltage monitor thresholds may be configured such that they provide signals to a digital control of a transient control circuit. At the same time, in some embodiments fault detection coverage may be provided by including a preset threshold for guaranteed critical path timing. In some embodiments the fault detection coverage is 100% fault detection coverage.

In some embodiments a digital control and power switch array provide fault prevention functionality similar to a transient control circuit, for example as discussed U.S. Pat. No. 9,515,553, the disclosure of which is incorporated by reference for all purposes. In some embodiments the transient control circuit improves, for example reduces or minimizes, a first voltage droop during power transitions. The fault detection and prevention functions may work in parallel and can be independent. They both may use signals from a voltage monitor array.

In some embodiments a fast clock is generated by a DLL such that multiple comparators provide voltage good signal (s) at twice the embedded core clock speed, for example allowing 100% fault detection coverage even for half clock cycle timing closure. In some embodiments an alarm signal, or faulty signal, is available within a few clock cycles delay, but provides 100% coverage by performing comparisons for every half clock cycle.

Figure 1:
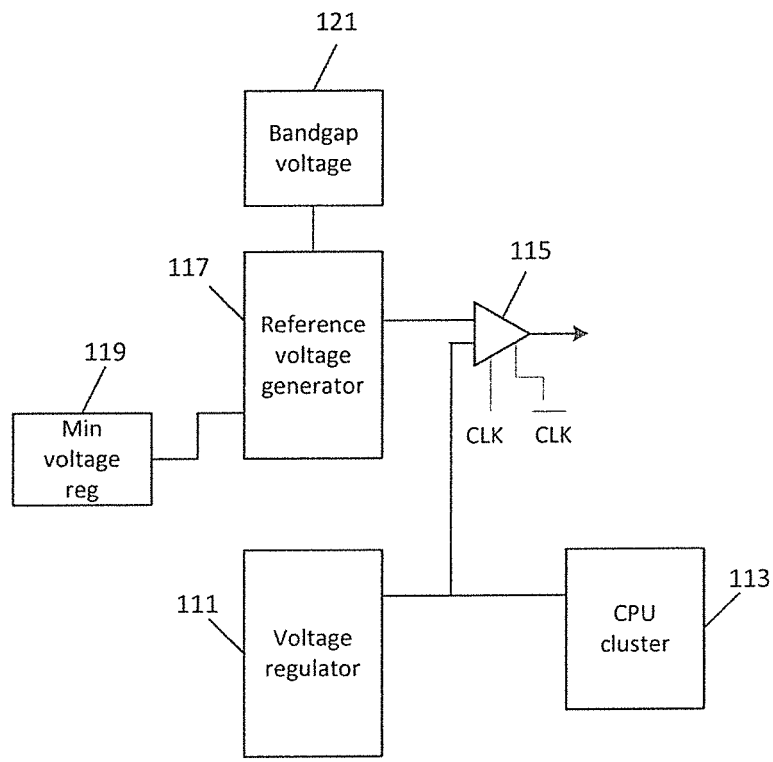
FIG. 1 is a block diagram showing a voltage regulator providing a regulated voltage supply to a load, along with a voltage supply related potential timing fault detector in accordance with aspects of the invention.

FIG. 1 is a block diagram showing a voltage regulator 111 providing a regulated voltage supply to a load 113, along with a voltage supply related potential timing fault detector in accordance with aspects of the invention. The voltage regulator may be, for example, a DC-DC switching voltage regulator. The load may be, for example, a CPU cluster, as illustrated in FIG. 1. In many embodiments the load is an embedded processor core, which may also be referred to as an embedded core. In some embodiments the voltage regulator and the embedded core may be on the same chip, and in some embodiments the voltage regulator and the embedded core may be in the same multi-chip module.

A comparator 115 compares a signal indicative of voltage supplied to the embedded core to an alarm reference voltage. The comparator generates an alarm signal if the signal indicative of voltage supplied to the embedded core is less than the alarm reference voltage. In the embodiment illustrated in FIG. 1, the signal indicative of voltage supplied to the embedded core is the voltage supplied to the embedded core by the voltage regulator. In some embodiments, however, the signal is taken from the embedded core, and in some embodiments the signal is a scaled version of either of those signals.

In the embodiment of FIG. 1, the comparator performs comparisons on rising edges of a clock signal CLK and its inverse signal, not CLK. In many such embodiments the clock signal is the same clock signal, or a clock signal at the same frequency, as the clock signal used by the embedded core for operations.

In the embodiment of FIG. 1, the alarm reference voltage is generated by a reference voltage generator 117. The reference voltage generator receives a bandgap voltage reference from a bandgap voltage circuit 121, and an indication of a design minimum voltage from a register 119. The design minimum voltage may be, for example, a minimum supply voltage specified for one or more critical timing paths of the embedded core during design of the embedded core, and used, for example, during synthesis operations in the design of integrated circuitry making up the embedded core.

The comparator, therefore, in various embodiments provides an alarm signal, or a fault signal, indicating that power supply voltage provided to the embedded core is below a specified design minimum at which proper operation of the embedded core is expected to be guaranteed. Moreover, in various embodiments use of a clock signal (or multiple clock signals) having a rate effectively twice the rate of the clock signal utilized by the embedded core allow for the determinations to effectively provide 100% coverage of such events on a per clock period basis.

Figure 2:
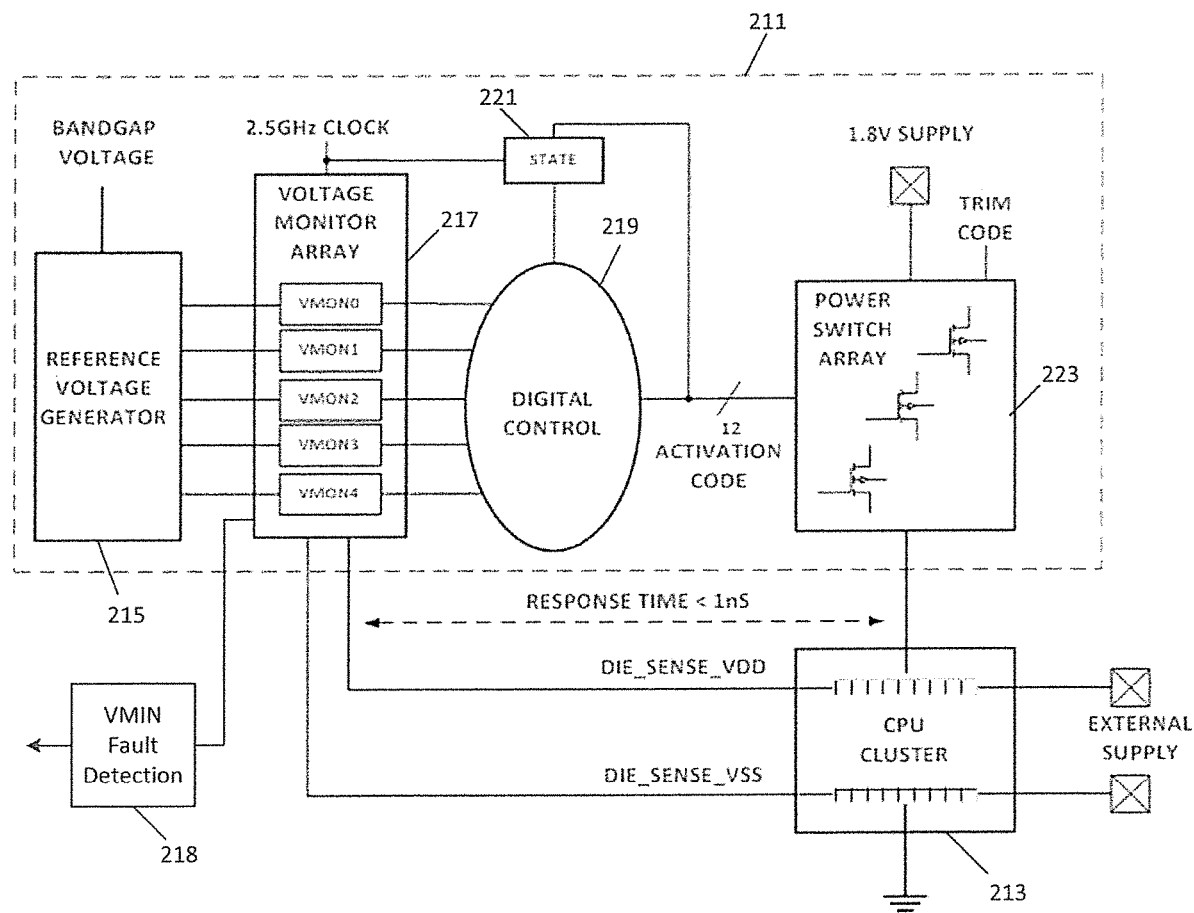
FIG. 2 is a block diagram of an example of use of a power supply fault detection circuit operating in conjunction with a transient control circuit for an embedded core, in accordance with aspects of the invention.

FIG. 2 is a block diagram of an example of use of a power supply fault detection circuit operating in conjunction with a transient control circuit 211 for a CPU cluster 213, in accordance with aspects of the invention. The CPU cluster may include, for example, one or more embedded cores. In some embodiments the fault detection circuit and the transient control circuit are on the same semiconductor die as the embedded core. In some embodiments the fault detection circuit and the transient control circuit are in the same multichip module as the embedded core.

The embedded core receives power from a voltage supply. The power may be, and usually is, regulated power, for example as provided by a voltage regulator, which may be for example a DC-DC switching converter. In some embodiments, and as illustrated in FIG. 2, the power may be provided by way of VDD and VSS lines. The transient control circuit receives signals indicative of voltages on the VDD and VSS lines. In some embodiments the signals are VDD and VSS signals. In some embodiments the signals are scaled or shifted versions of VDD and VSS, or one of them.

The signals indicative of VDD and VSS are provided to a voltage sensor array block 217. The voltage sensor array block includes an array of voltage sensors, with the voltage sensor array block 217 illustrated with an exemplary five voltage sensors. Each voltage sensor includes at least one element for comparing a reference voltage to a difference between the signals indicative of VDD and VSS, with generally each voltage sensor receiving a different reference voltage. In some embodiments, for example embodiments in which the transient control circuit and the embedded core share the same VSS signal, and in which the indication of voltage on the VSS line is a scaled version of the VSS voltage, each element may comprise a comparator. In various embodiments, however, each element may comprise at least one comparator and other circuitry. In many embodiments the voltage sensors are clocked sensors. In some embodiments the sensors are clocked at clock rates comparable to clock rates of the CPU/GPU cluster, for example at a clock rate between half and twice the clock rate of the CPU/GPU cluster. In some embodiments the clock rate is in the range of 2-4 GHz, and in some embodiments the clock rate is 2.5 GHz, and in some embodiments the clock rate is greater than 5 GHz. In many embodiments the voltage sensors, or at least a one of them receiving a threshold alarm reference voltage as discussed below, is clocked at a rate at least twice that of clock rate for operations of the embedded core.

The voltage sensor array block receives threshold voltage signals from a threshold voltage generator 215. The threshold voltage generator generates threshold voltage signals at what may be considered threshold voltages of interest. For example, in some embodiments the threshold voltages of interest may include a voltage level desired for provision to the embedded core, various voltage levels at predefined percentages of the voltage level desired for provision to the embedded core, and a voltage level that is a minimum voltage design specification for operation of the embedded core.

In the embodiment of FIG. 2, the threshold voltage generator receives a bandgap voltage reference signal. In most embodiments the threshold voltage generator also receives a voltage target signal, namely a signal indicative of a desired voltage for operation of the embedded core, and a signal indicative of the minimum voltage design specification for operation of the embedded core. The threshold voltage generator uses these signals to generate the threshold voltage signals. In some embodiments the voltage target signal, and/or the minimum voltage design specification signal, may be stored in registers, which may be for example written to by a host processor.

Output of a one of the voltage sensors is provided to a minimum voltage fault detection block 218. The voltage sensor providing the output is, in many embodiments the voltage sensor that compares the indication of supply voltage to the embedded core with the voltage level that is a minimum voltage design specification for operation of the embedded core. The output indicates that the supply voltage to the embedded core is below the minimum voltage design specification for operation of the embedded core. The minimum voltage fault detection block, based on the output, provides a signal, for example to a host processor, indicating that a power supply related critical path possible timing fault has occurred. In some embodiments the minimum voltage fault detection block provides such a signal for every clock cycle for which a power supply related critical path possible timing fault occurs. For example, in some embodiments the minimum voltage fault detection block may include a signal indicating a count of cycles for which the fault condition has occurred, or some other mechanism to signal, for example a host processor, that a fault condition has continued for more than one cycle, or that a fault condition has newly occurred.

The embodiment of FIG. 2 includes, by way of the transient control circuit, features to reduce the possibility of a power supply related critical path possible timing fault. In the embodiment of FIG. 2, the transient control circuit detects, by way of the voltage monitor array 217, a lower than desired voltage being supplied to the embedded core. As the voltage monitor array is generally clocked at a speed approximate the clock speed of the embedded core, voltage droops may be detected within a clock cycle of occurrence, in various embodiments.

Digital control circuitry 219 of the transient control circuit activates switches of a power switch array 223, based on outputs of the voltage sensors of the voltage monitor array, and a state register 221 indicating a state of the transient control circuitry. The power switch array selectively couples a source of power, for example a source of power used to provide power to a voltage regulator, to VDD of the embedded core. In some embodiments the power switch array includes a plurality of paths between the power source and the VDD line of the embedded core, with each path providing for provision of a discrete amount of current to the VDD line. Activation of increasing of number of paths, by way of activation of increasing number of switches, therefore allows for application of differing amounts of current to combat droop in voltage regulator supplied power.

In some embodiments the digital control activates, and/or deactivates, power switches so as to increase, or decrease, supplied current in a ramping manner. In some embodiments the ramping provision or withdrawal of supplied current occurs within a single clock cycle for the embedded core.

Figure 3:
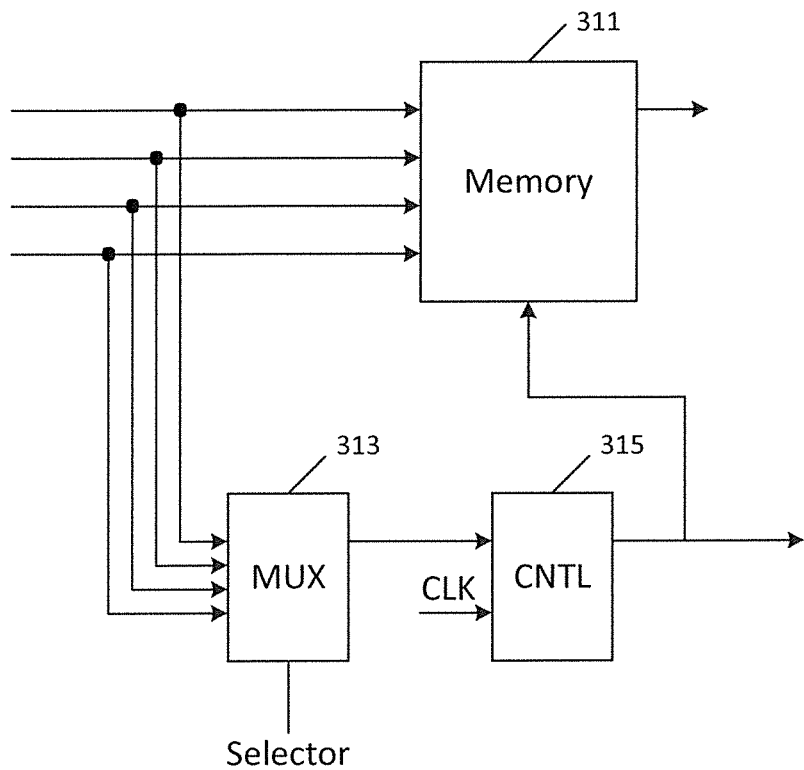
FIG. 3 is a block diagram of a further example of a fault detection circuit in accordance with aspects of the invention.

FIG. 3 is a block diagram of a further example of a fault detection circuit in accordance with aspects of the invention. The fault detection circuit receives outputs from voltage sensors that compare an indication of voltage supplied to an embedded core with predefined, or programmable, voltage levels. In some embodiments the voltage sensors are as discussed with respect to FIG. 2, or as later discussed with respect to FIGS. 5A-C.

The outputs of the voltage sensors are supplied to a multiplexer 313. A selector signal to the multiplexer selects a one of the outputs to pass to control circuitry 315. In many embodiments the selector signal selects the one of the outputs that corresponds to a comparison of a design specified minimum supply voltage to the embedded core with an actual supplied voltage to the embedded core. In some embodiments the selector signal selects the one of the outputs that corresponds to a comparison of an otherwise determined minimum supply voltage that provides for proper critical path timing for operation of the embedded core with actual supplied voltage to the embedded core. In some embodiments the selector signal selects the one of the outputs that corresponds to a comparison of a minimum supply voltage that provides for proper path timing for a particular logic path in operation of the embedded core with actual supplied voltage to the embedded core.

The control circuitry 315 receives the selected output from the multiplexer. The control circuitry includes circuitry to provide a potential fault alarm, which is an indication that the selected output indicates that the voltage supplied to the embedded core is less than the voltage indicated by the comparison value. In many embodiments the fault alarm indicates that the supplied voltage is insufficient to guarantee correct critical timing path operations for a load such as a processor.

In some embodiments, and as illustrated in FIG. 3, the control circuitry also provides the potential fault alarm signal, or a trigger signal indicating the alarm signal is active, to a memory 311. In various embodiments the contents of the memory may be provided to a host processor, for example. In some embodiments the memory is continuously written with information from the sensors, unless the potential fault alarm signal is active, or the potential fault alarm signal was active and the memory has not been read by, for example, the host processor. In some embodiments the memory utilizes the trigger signal as a write signal, with the memory storing the outputs of the voltage sensors on the occurrence of a potential fault alarm.

Figure 4:
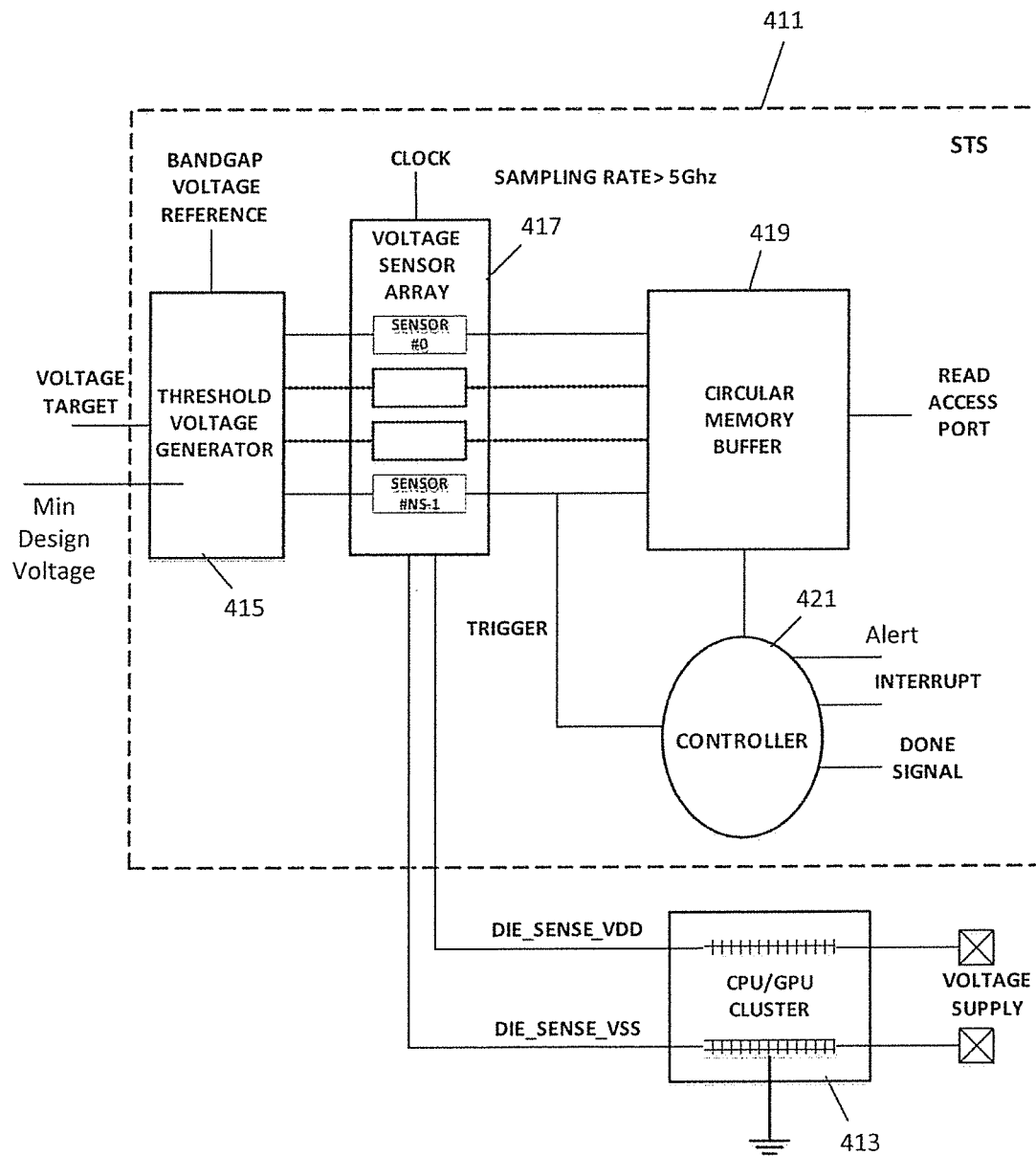
FIG. 4 is a block diagram of an example circuit including a minimum supply voltage potential timing fault alarm function.

FIG. 4 is a block diagram of an example circuit including a minimum supply voltage potential timing fault alarm function. The example circuit includes a sampling and alarm block 411 and a CPU/GPU cluster 413, in accordance with aspects of the invention. In some embodiments the CPU/GPU cluster are on a common semiconductor die. In some embodiments the supply transient scope block is also on the common semiconductor die. In some embodiments the supply transient scope block and the CPU/GPU cluster are in the same multichip module. In various embodiments the CPU/GPU cluster includes one or more embedded cores.

The CPU/GPU cluster receives power from a voltage supply. The power may be, and usually is, regulated power, for example as provided by a voltage regulator, which may be for example a DC-DC switching converter. In some embodiments, and as illustrated in FIG. 4, the power may be provided by way of VDD and VSS lines. The supply transient scope block receives signals indicative of voltages on the VDD and VSS lines. In some embodiments the signals are VDD and VSS signals. In some embodiments the signals are scaled or shifted versions of VDD and VSS, or one of them.

The signals indicative of VDD and VSS are provided to a voltage sensor array block 417. The voltage sensor array block includes an array of voltage sensors, with the voltage sensor array block 417 illustrated with an exemplary four voltage sensors. Each voltage sensor includes at least one element for comparing a reference voltage to a difference between the signals indicative of VDD and VSS, with generally each voltage sensor receiving a different reference voltage. In some embodiments, for example embodiments in which the sampling and alarm block and the CPU/GPU cluster share the same VSS signal, and in which the indication of voltage on the VSS line is a scaled version of the VSS voltage, each element may comprise a comparator. In various embodiments, however, each element may comprise at least one comparator and other circuitry. In many embodiments the voltage sensors are clocked sensors. In some embodiments the sensors are clocked at clock rates at least twice the clock rates of the CPU/GPU cluster, for example at a clock rate between half and twice the clock rate of the CPU/GPU cluster.

The voltage sensor array block receives threshold voltage signals from a threshold voltage generator 415. The threshold voltage generator generates threshold voltage signals at what may be considered threshold voltages of interest. For example, in some embodiments the threshold voltages of interest may include some voltages above a minimum voltage design specification for operation of the CPU/GPU cluster, and some voltages below the minimum voltage design specification for operation of the CPU/GPU cluster.

In the embodiment of FIG. 4, the threshold voltage generator receives a bandgap voltage reference signal, a voltage target signal, and a minimum design supply voltage signal. In many embodiments the minimum design supply voltage signal is indicative of a minimum supply voltage necessary for critical timing path operations specified for synthesis of the embedded core(s) during design of the embedded cores. The threshold voltage generator uses the bandgap voltage reference signal, for example provided by a bandgap circuit, to generate threshold voltage signals at offsets to a voltage indicated by the voltage target signal, and, in various embodiments, to generate a minimum design threshold supply voltage signal.

In the embodiment of FIG. 4, a controller 421 receives a minimum supply voltage fault trigger signal from the voltage sensor array. In some embodiments the controller comprises logic circuitry. In some embodiments the controller comprises processor elements configured by program instructions. The minimum supply voltage fault trigger signal may be output from the voltage sensor effectively comparing supply voltage provide to the CPU/GPU cluster with the minimum design voltage signal. The controller uses the minimum supply voltage fault trigger signal to determine when to generate an alert signal. The alert signal indicates that the supply voltage to the CPU/GPU cluster has dropped below the minimum supply voltage. The alert signal may be provided, for example, to a host processor.

In some embodiments, and as illustrated in. FIG. 4, the controller also uses the minimum supply voltage fault trigger signal to command a memory 319 to cease writing memory elements, or to cease providing a signal to the memory allowing for writes to the memory elements. The memory elements may store information indicative of the output of the voltage sensors, and the memory may be in the form of a circular buffer, sized for example to store outputs of the voltage sensors from a predetermined number of clock cycles. In some embodiments the trigger signal initiates a counting of clock cycles by the controller, with completion of the counting indicating that writes to the memory should cease. In some embodiments the controller counts 10 clock cycles, in some embodiments 16 clock cycles, in some embodiments 32 clock cycles, and in some embodiments a programmable number of clock cycles: In some embodiments the memory stores 64 samples from the voltage sensors, and in some embodiments the memory stores 64 samples from each of the voltage sensors. In various embodiments the memory may be read by a host processor, or contents of the memory may be provided to the host processor.

Figure 5A:
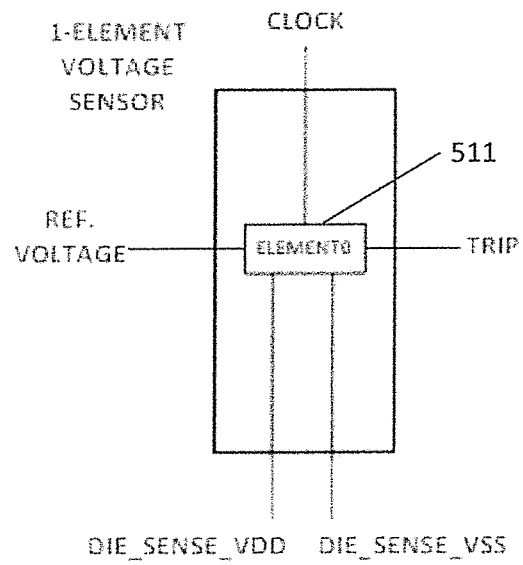
FIGS. 5A-C provide block diagrams of voltage sensors in accordance with aspects of the invention.
Figure 5B:
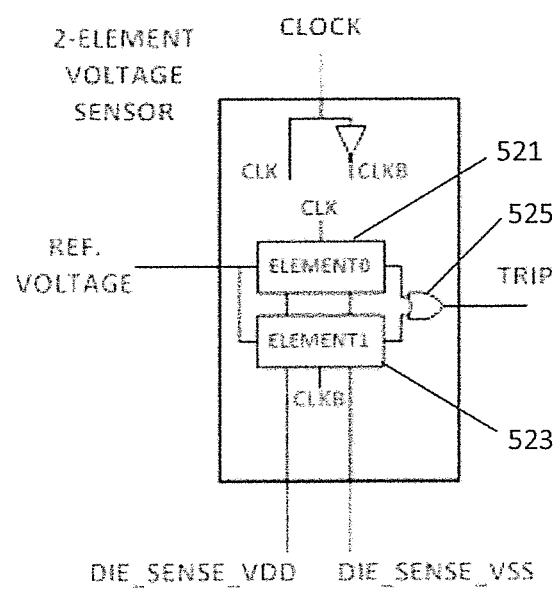
Figure 5C:
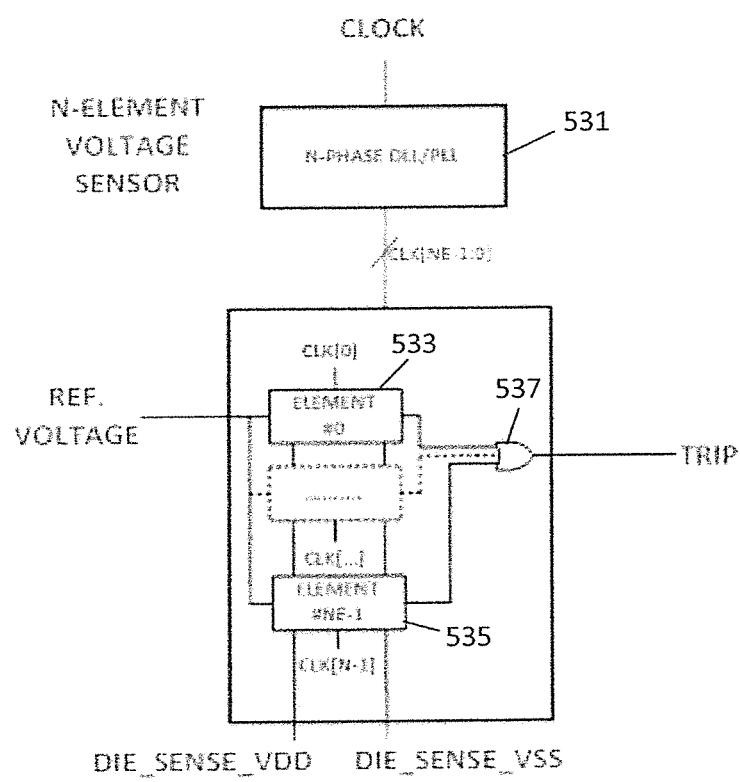

FIGS. 5A-C provide block diagrams of voltage sensors in accordance with aspects of the invention. In various embodiments the voltage sensors of FIGS. 5A-C may be used as the comparator of FIG. 1 or in the voltage sensor array of FIGS. 3 and 4.

FIG. 5A illustrates a single element voltage sensor 611. The single element voltage sensor receives a reference voltage, and compares the reference voltage to an indication of supply voltage of a CPU/GPU cluster, which may include one or more embedded cores. The reference voltage is a voltage indicative of a minimum supply voltage for the embedded core at which critical timing path operations of the embedded core are believed to be guaranteed. In some embodiments the reference voltage is a minimum supply voltage specified for synthesis operations in the design of the embedded core. If the reference voltage is greater than the indication of supply voltage of the CPU/GPU cluster, the element provides a trip signal.

The element performs the comparison on a clocked basis, and accordingly the element also receives a clock signal. In most embodiments, the clock signal is a clock signal at at least twice the rate of a clock signal used by the embedded core for logic operations. Use of a clock signal at at least twice the rate of the clock signal used by the embedded core for logic operations may provide for complete coverage, on a clock cycle basis, of whether supply voltage provided to the embedded core is above the minimum specified supply voltage for critical timing path operations.

FIG. 5B illustrates a dual element voltage sensor. The dual element voltage sensor includes a first element 521 and a second element 523. The dual element voltage sensor receives a reference voltage, and each of the elements compares the reference voltage to an indication of supply voltage of a CPU/GPU cluster. The elements perform the comparison on a clocked basis, and accordingly the element also receives a clock signal. In the embodiment of FIG. 5B, the dual element voltage sensor is shown as including an inverter to invert the clock signal, with the clock signal being provided to the first element and the inverse of the clock signal being provided to the second element. Outputs of the elements are provided to an OR gate 625. If the reference voltage is greater than the indication of supply voltage of the CPU/GPU cluster, as clocked by either of elements, the OR gate of the element provides a trip signal. For the dual element voltage signal, therefore, assuming that the elements are clocked on rising clock edges, two comparisons are made per clock cycle, with either of the comparisons indicating below threshold voltage being sufficient to generate the trip signal. Use of the dual element voltage sensor of FIG. 5B may be suitable, for example, when the clock signal is at the same frequency as that of a clock signal provided to the CPU/GPU cluster, with the dual elements providing for two comparisons per clock cycle of the CPU/GPU cluster.

FIG. 5C illustrates an n-element voltage sensor, n greater than 2. The n-element voltage sensor is similar to the dual element voltage sensor, but with n elements, instead of only two elements. Accordingly, the n-element voltage sensor includes a first element 633, and other elements until an nth element 635. As with the dual element voltage sensor, outputs of the elements are provided to an OR gate 637, which provides the trip signal if any of the sensor elements indicate supply voltage to the CPU/GPU cluster being below the specified minimum supply voltage. In addition, to provide a sufficient number of rising clock edges, an n-phase DLL or PLL 631, or a delay line in some embodiments, is used to provide n rising clock edges. The use of the n-element voltage sensor may provide for complete coverage for comparisons of supply voltage and minimum supply voltage in implementations in which the clock signal used by potential fault detection circuitry has a frequency less than that of a clock signal used for logic operations of the CPU/GPU cluster.

Although the invention has been discussed with respect to various embodiments, it should be recognized that the invention comprises the novel and non-obvious claims supported by this disclosure.

What is claimed is:

1. A method for performing processor power supply related timing fault detection, comprising:
   storing an indication of a design minimum voltage, the design minimum voltage being a minimum power supply voltage specified for a critical timing path of an embedded processor during design of the embedded processor;
   generating an alarm reference voltage using the indication of the design minimum voltage;
   comparing the alarm reference voltage to a voltage indicative of a voltage supplied to the embedded core at a clock rate at least twice as fast as a rate of a clock signal used to operate the embedded core;
   setting an alarm signal in response to the alarm reference voltage being greater than the voltage indicative of the voltage supplied to the embedded core;
   repeatedly comparing the voltage indicative of a voltage supplied to the embedded core to a plurality of other voltages;
   writing to memory at least some results of the comparisons of the voltage indicative of a voltage supplied to the embedded core to the plurality of other voltages; and
   ceasing to write to memory results of the comparisons of the voltage indicative of a voltage supplied to the embedded core to the plurality of other voltages in response to the alarm reference voltage being greater than the voltage indicative of the voltage supplied to the embedded core.

2. The method of claim 1, wherein the memory is a circular buffer.

3. The method of claim 1, wherein the design minimum voltage is the minimum safe voltage for delays of the critical timing path determined during timing closure procedures related to synthesis of logic elements.

4. The method of claim 1, wherein the comparing the alarm reference voltage to a voltage indicative of a voltage supplied to the embedded core and the comparing the voltage indicative of a voltage supplied to the embedded core to a plurality of other voltages is performed by a voltage monitor array.

5. The method of claim 4, wherein the voltage monitor array makes use of both rising and falling edges of a clock signal that is as fast the rate of the clock signal used to operate the embedded core.

6. The method of claim 4, wherein the voltage monitor array makes use of a multiple phases of a clock signal generated by a phase locked loop (PLL) or a digital locked loop (DLL).

7. Circuitry for performing processor power supply related timing fault detection, comprising:
   a reference voltage generator configured to generate an alarm reference voltage indicative of a design minimum voltage, the design minimum voltage being a minimum power supply voltage specified for a critical timing path of an embedded processor during design of the embedded processor, the reference voltage generator being additionally configured to generate a plurality of voltages of interest;
   at least one voltage monitor configured to determine whether power supply voltage supplied to the embedded processor is less than the alarm reference voltage at a clock rate at least twice as fast as a rate of a clock signal used to operate the embedded core, the at least one voltage monitor being part of an array of voltage monitors, each voltage monitor of the array of voltage monitors, other than the at least one voltage monitor, being configured to compare corresponding ones of the plurality of voltages of interest with the supply voltage supplied to the embedded processor.

8. The circuitry of claim 7, wherein the memory is a circular buffer.

9. The circuitry of claim 7, further comprising a register configured to store a value indicative of the design minimum voltage.

10. The circuitry of claim 7, wherein the reference voltage generator is configured to generate the plurality of voltages of interest based on a bandgap voltage reference signal and a signal indicative of a desired voltage for operation of the embedded core.

11. The circuitry of claim 9, wherein the reference voltage generator is configured to generate the alarm reference voltage based on a bandgap voltage reference signal and the value indicative of the design minimum voltage.

12. The circuitry of claim 7, further comprising a memory configured to store at least some results of the comparisons of the supply voltage supplied to the embedded core to the plurality of voltages of interest.

13. The circuitry of claim 12, wherein the memory is configured to cease storing results of the comparisons of the supply voltage supplied to the embedded core to the plurality of voltages of interest in response to the alarm reference voltage being greater than the supply voltage supplied to the embedded core.

* * * * *